(12) United States Patent
Gluck et al.

(10) Patent No.: US 11,343,878 B2
(45) Date of Patent: May 24, 2022

(54) METHOD OF CONTROLLING A COOKING APPLIANCE, COOKING APPLIANCE, AND HEATING ELEMENT

(71) Applicants: FRIMA INTERNATIONAL AG, Heerbrugg (CH); RATIONAL AKTIENGESELLSCHAFT, Landsberg am Lech (DE)

(72) Inventors: Pascal Gluck, Sausheim (FR); Annika Katharina Junghanns, Lansberg am Lech (DE); Markus Lingenheil, Breisach (DE); Pascal Schmidlin, Lutterbach (FR)

(73) Assignees: RATIONAL INTERNATIONAL AG; RATIONAL AKTIENGESELLSCHAFT

( * ) Notice: Subject to any disclaimer, the term of this patent is extended or adjusted under 35 U.S.C. 154(b) by 357 days.

(21) Appl. No.: 15/771,052

(22) PCT Filed: Oct. 19, 2016

(86) PCT No.: PCT/EP2016/075070
§ 371 (c)(1),
(2) Date: Apr. 25, 2018

(87) PCT Pub. No.: WO2017/072002
PCT Pub. Date: May 4, 2017

(65) Prior Publication Data
US 2018/0332664 A1 Nov. 15, 2018

(30) Foreign Application Priority Data
Oct. 28, 2015 (DE) ..................... 10 2015 118 397.8

(51) Int. Cl.
*H05B 1/02* (2006.01)
*H02J 3/26* (2006.01)
*H05B 3/68* (2006.01)

(52) U.S. Cl.
CPC .............. *H05B 1/0261* (2013.01); *H02J 3/26* (2013.01); *H05B 3/68* (2013.01); *H02J 2310/14* (2020.01);
(Continued)

(58) Field of Classification Search
CPC .................................................. H05B 1/0266
See application file for complete search history.

(56) References Cited

U.S. PATENT DOCUMENTS

| 6,111,231 A * | 8/2000 | Corson | ................ H05B 1/0266 |
| | | | 219/448.11 |
| 6,365,988 B1 | 4/2002 | Imer et al. | ...................... 307/31 |

(Continued)

FOREIGN PATENT DOCUMENTS

| DE | 19934199 | 1/2002 | ............... H05B 1/02 |
| DE | 102011078047 | 12/2012 | ............... H02J 3/26 |

(Continued)

OTHER PUBLICATIONS

International Preliminary Report on Patentability (w/translation) issued in application No. PCT/EP2016/075070, dated May 1, 2018 (16 pgs).

(Continued)

*Primary Examiner* — Daniel Kessie
(74) *Attorney, Agent, or Firm* — Hayes Soloway P.C.

(57) ABSTRACT

Described is a method of controlling a cooking appliance which includes at least one electrical load and a controller. The electrical load is variably connected to at least one of a plurality of phases of a power connection. The phase is (Continued)

selected from among the plurality of phases. Furthermore, a cooking appliance and a heating element are described.

16 Claims, 2 Drawing Sheets

(52) U.S. Cl.
CPC ............... *Y02B 70/30* (2013.01); *Y02E 40/50* (2013.01); *Y04S 20/242* (2013.01)

(56) References Cited

U.S. PATENT DOCUMENTS

| | | | | |
|---|---|---|---|---|
| 6,841,761 | B1* | 1/2005 | Banzato | F24C 15/106 |
| | | | | 219/486 |
| 8,558,148 | B2* | 10/2013 | Artigas Maestre | H05B 6/065 |
| | | | | 219/664 |
| 2009/0139980 | A1 | 6/2009 | Acero Acero et al. | 219/489 |
| 2009/0294434 | A1* | 12/2009 | Fonseca | H05B 1/0266 |
| | | | | 219/498 |
| 2010/0200565 | A1* | 8/2010 | Leung | H05B 3/68 |
| | | | | 219/443.1 |
| 2011/0147366 | A1* | 6/2011 | Franca | H05B 1/0266 |
| | | | | 219/443.1 |
| 2016/0150597 | A1* | 5/2016 | Yun | H05B 6/1272 |
| | | | | 219/662 |
| 2017/0086258 | A1* | 3/2017 | Burkhardt | A47J 27/004 |

FOREIGN PATENT DOCUMENTS

| | | | | |
|---|---|---|---|---|
| DE | 102013207786 | 12/2013 | ................ | F24C 7/08 |
| EP | 0980195 | 8/1999 | ............... | H05B 3/74 |
| EP | 2665346 | 5/2013 | ............. | H05B 37/02 |
| WO | WO2007048700 | 5/2007 | ................ | H05B 6/04 |
| WO | WO2015007886 | 1/2015 | ................ | H02J 3/00 |

OTHER PUBLICATIONS

International Search Report (w/translation) and Written Opinion (no translation) issued in application No. PCT/EP2016/075070, dated Jan. 31, 2017 (15 pgs).

\* cited by examiner

Determining the current phase loads of the phases

↓

Determining the phase with the currently lowest phase load

↓

Determining the future power demand of the electrical loads

↓

Connecting an electrical load to the phase
that currently has the lowest phase load

METHOD OF CONTROLLING A COOKING APPLIANCE, COOKING APPLIANCE, AND HEATING ELEMENT

BACKGROUND OF THE INVENTION

The invention relates to a method of controlling a cooking appliance, a cooking appliance, and a heating element for a cooking appliance.

In canteen or professional kitchens, cooking appliances are used which often have more than one electrical load, for example a heating for the cooking chamber atmosphere, a microwave generator, a fan, a steam generator, a drive motor for a pan, or a heating device having at least one heating area for a cooking surface. This results in a high nominal connected load of the cooking appliance, which corresponds to the sum of the individual maximum wattages of the electrical loads. This is also referred to as gross output. However, regarding their connected load, the cooking appliances are usually designed in such a way that the rated power, that is, the expected actual power input, is below the gross output. When designing the connected load, it is assumed that all electrical loads are never ON at the same time, so that the gross output is not needed. As a result, the connection or installation conditions can be kept simple, so that the cooking appliances can be connected to a conventional three-phase power connection.

As a rule, the electrical loads are permanently connected to a particular phase of the electrical power supply or power connection through which the electrical loads are supplied. For example, the steam generator and the microwave generator are permanently connected to a first phase, whereas the fan is permanently connected to a second phase, and the cooking chamber heating is permanently connected to a third phase of the three-phase power supply. This results in the electrical loads always being connected to the same phase when they are switched on.

Typically, the electrical loads are dedicated to the phases in such a manner that the phase load resulting in operation of the cooking appliance is distributed as evenly as possible when the electrical loads of the presumably most frequently used cooking programs are ON at the same time. However, because of the different cooking programs that are nowadays provided in cooking appliances for canteen or professional kitchens, it may occur that all electrical loads are switched on that are connected to one single phase, whereas the other phases are not loaded. This requires either a higher connected load, which makes the connection conditions more complicated, or the power consumption of the electrical loads is limited by the controller in order not to exceed the maximum current consumption per phase. This, however, may have an effect on the power or output potential of the cooking appliance and on the cooking result.

SUMMARY OF THE INVENTION

It is the object of the invention to provide a method of controlling a cooking appliance and a cooking appliance that allow to achieve as low a connected load as possible with the same power or output potential.

The object is achieved according to the invention by a method of controlling a cooking appliance which includes at least one electrical load and a controller, the electrical load being variably connected to at least one of a plurality of phases of a power connection, the phase being selected from among the plurality of phases.

The object is further achieved according to the invention by a cooking appliance including at least one electrical load, a controller, and a variable phase switching means which variably switches the electrical load with at least one of a plurality of phases of a power connection, the phase being selected from among the plurality of phases.

The basic idea of the invention is that as symmetrical a phase load as possible is achieved at all times, which is independent of the electrical loads switched on. This means that the electrical loads are distributed to the phases as uniformly as possible, so that each of the individual phases is loaded to approximately the same extent. To this end, rather than being dedicated to one single specific phase, the electrical loads can be variably connected to one or also more phases of the power connection. "Variable" means that the load is either assigned to a specific phase before switching on or is switched from one phase to another during operation. Here, the controller makes a selection to which phase out of the available phases the electrical load is connected. Accordingly, a non-symmetrical phase load is generally avoided, which could result in a reduced wattage of at least one of the electrical loads that are ON. Since the phase load is always as symmetrical as possible, the actual connected load can be selected to be comparatively low because the maximum current consumption of an individual phase is reached as late as possible. Accordingly, the power potential of the electrical loads does not need to be reduced accordingly. There are therefore neither any restrictions with regard to the power potential nor any more complicated connection or installation conditions.

It may be provided that the variable phase switching means comprises a controller itself, which is driven by the controller of the cooking appliance, or is configured without a controller of its own, so that the controller of the cooking appliance drives the phase switching means in an appropriate manner.

One aspect of the invention provides that the future power demand of the electrical load is acquired by the controller. For example, the controller accesses an ongoing cooking program in order to determine whether an electrical load will be connected or switched off shortly, which would result in a change in the future power demand of this electrical load. Furthermore, increases or reductions in power of an electrical load that is already ON can also be acquired. Accordingly, the controller is able to acquire the future power demand of each electrical load and, correspondingly, of the entire cooking appliance. Generally, it is therefore possible that the controller can react in good time to future changes in power input or consumption.

More particularly, depending on its future power demand, the electrical load is connected to a selected one of the plurality of phases of the power connection. The selection of one out of the plurality of phases is therefore effected on the basis of the future power demand of the electrical load. The controller detects which power input an electrical load will soon require and selects one of the plurality of phases accordingly, so that the phases are loaded as symmetrically as possible. Should an electrical load have a higher power demand soon, the controller can connect this load to the phase of the power connection which has the smallest number of electrical loads applied to it.

According to a further aspect, the current phase load of the respective phases of the power connection is acquired by the controller. The controller can thus detect which one of the phases is least loaded in the present state. Accordingly, it is not only possible to make a statement about the future load, but also about the current load. In addition, a qualitative statement can be made with respect to the phase load, i.e. with respect to the actual level of the load on the phase, since it is not only detected how many electrical loads are connected to the phase in question. This means that a specific value of the phase load is acquired.

In particular, an electrical load which is being connected or has a higher future power demand is connected to the phase of the power connection which has the lowest current phase load. In this way, the overall electrical load is distributed to the individual phases as symmetrically as possible, so that a plurality of electrical loads can be operated simultaneously, with their power potential not having to be restricted.

A further aspect provides that the allocation of the electrical load to a phase of the power connection is checked by the controller in cycles and, if required, is changed. The allocation of the electrical load to a phase is therefore effected not only during switching on, but also during operation, so that the symmetrical load distribution of the phases is permanently ensured. The controller checks at specified intervals whether the allocation of the electrical loads to the phases and the current and future phase loads result in a symmetrical distribution. Should the controller detect here that there is or will soon be a non-symmetrical phase load, the controller can apply at least one of the electrical loads to a different phase of the power connection in order to make the phase loads more symmetrical.

According to one embodiment, it may be provided that the electrical load is variably connected to two phases of the power connection. This is of advantage when an electrical load has a power demand that is so high that it would lead to a non-symmetrical load distribution if this electrical load is connected to merely one phase.

According to a further embodiment, two electrical loads are provided, both of which are variably connected to the same phase of the power connection. This is of advantage when two electrical loads having a lower power demand are provided, whereas two further loads have a high power demand, so that a symmetrical load distribution is possible. The two electrical loads may also be part of a superordinate assembly, for example two heating circuits of a heating element, which should preferably be allocated to the same phase, unless this interferes with the symmetrical distribution.

There is therefore no fixed allocation of the electrical load(s) to one or more phases, since the electrical load(s) are variably switched between the phases depending on the loading of the individual phases of the power connection, in order to always distribute the loading symmetrically to the individual phases. This applies in particular to power-intensive electrical loads, such as heating elements or the like. An electrical load with a low power consumption (for example, such as a controller), on the other hand, may be dedicated to one phase.

In other words, this means that the electrical load(s) is/are variably connected to any of the phases of the power connection since the electrical load(s) is/are connected to a first phase or a second phase depending on the current and/or future loading of the phases.

The electrical load of the cooking appliance may be dedicated to two or more phases, the controller selecting at least one of the dedicated phases to variably connect the electrical load to at least one of the dedicated phases of the power connection. The variable connection may be effected by means of a controller which connects the electrical load to at least one of the allocated phases via the variable phase switching means. The electrical load is therefore also flexibly connected to at least one of the plurality of phases, the flexibility being slightly limited since a selection is only made from among the dedicated phases. The electrical load involved may in particular be a heating element which includes two or more heating circuits.

The phase switching means may be connected to all the phases of the power connection via at least one interface. This allows the electrical loads connected to the phase switching means to be variably switched between all the phases of the power connection, since a change of the allocated phase is effected via the interface. In particular, three interfaces, that is, one per phase, may be provided.

The electrical load may be a heating device which has at least two heating areas, the heating areas being two heating zones of a heating element or being formed by two separate heating elements. For example, a heating device may be involved here which is allocated to two cooking surfaces. The heating device may also be formed by one single heating element which comprises a main heating circuit and an auxiliary heating circuit. The auxiliary heating circuit may, for example, be optionally connected if a rapid heating is desired.

The two heating zones of a heating element may also be fixedly connected to a respective phase; here, only that heating zone of a heating element is driven by the controller which is allocated to the phase with the smaller load. Therefore, a variable connection of the electrical load configured as a heating element is also possible. This option is relevant in particular if the two heating zones of one heating element are designed to be equally powerful.

The phase switching means may be an intelligent solid state relay (SSR) or semiconductor relay, a contactor, a switching system, an intelligent relay, or a plurality of (solid state) relays connected in series. The phase switching means therefore not only conducts a high power current or blocks it, but is connected to all phases of the power connection, so that any desired phase can be connected with the electrical load.

Generally, the method and also the cooking appliance allow the electrical loads of a cooking appliance to be connected to the least loaded phase of the power connection in an automated manner, whereby a balanced phase load of the power connection is achieved. As a result of the intelligent power management, there is thus no need to put up with any power losses, as would be the case if a plurality of electrical loads that are fixedly connected to a predetermined phase are operated at the same time.

The invention further relates to a heating element for a cooking appliance, the heating element including at least two heating zones which each have their own connection for a phase of a power connection. The heating zones may be in the form of heating circuits having the same strength or different strengths, so that a main circuit and an auxiliary circuit are formed, for example. Moreover, the heating zones may be arranged next to each other or on top of each other in one heating element. Since each of the heating zones has a connection of its own, one heating element may be connected to a plurality of phases of the power connection at the same time, the allocation of the heating zones to the phases being fixed or variable.

When the phases are dedicated, a controller and/or a phase switching means of a cooking appliance may connect a respective individual heating zone to the phase dedicated to it, in particular as a function of the loading on the phases of the power connection. This means that the heating element can be flexibly connected to one of the plurality of dedicated phases by the controller.

Alternatively, the individual heating zones can be flexibly switched between all phases of the power connection by means of the controller and/or the phase switching means of the cooking appliance.

Accordingly, the allocation of the heating element is always flexible, regardless of whether the individual heating zones of the heating element are fixedly or variably allocated to a phase.

BRIEF DESCRIPTION OF THE DRAWINGS

Further advantages and features of the invention will be apparent from the description below and from the drawings, to which reference is made and in which.

DETAILED DESCRIPTION OF THE INVENTION

Figure 1:
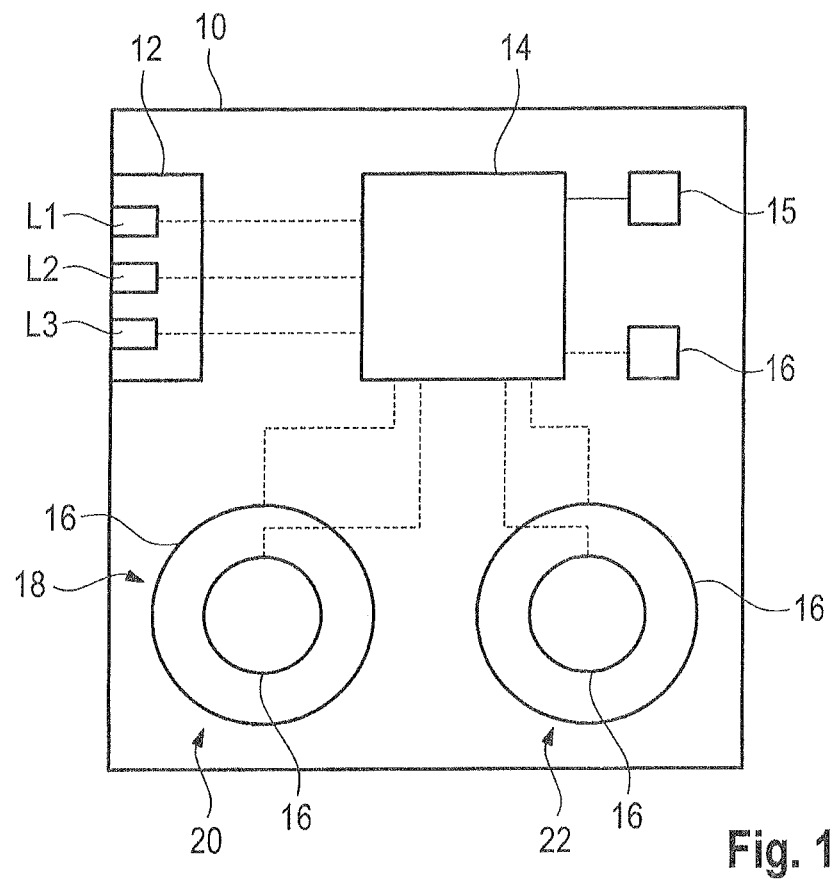
FIG. 1 shows a schematic illustration of a cooking appliance according to the invention.

FIG. 1 schematically shows a cooking appliance 10 which includes a power connection 12 for three phases L1, L2, L3. The power connection 12 is therefore a conventional three-phase power connection or connection for a three-phase alternating current.

In the embodiment shown, the cooking appliance 10 comprises a variable phase switching means 14, a controller 15 connected to the phase switching means 14, and five electrical loads 16. Four of the electrical loads 16 are part of a heating device 18, whereas the fifth electrical load 16 may, for example, be an electric motor which is used for lifting a pan or adjusting a lid. Generally, the cooking appliance 10 may comprise further electrical loads that are not illustrated in the figures, such as, e.g., a microwave source, a steam generator, a fan or a heating for the cooking chamber atmosphere.

If the further electrical loads have a high current consumption, they may be connected analogously to the electrical loads 16 shown, that is, via the variable phase switching means 14. If the electrical loads involved have a low current consumption, they may be dedicated to a particular phase.

In the embodiment shown, the heating device 18 includes two heating areas 20, 22, which are assigned to cooking surfaces (not illustrated here) of the cooking appliance 10. The cooking surfaces can be heated by means of the heating areas 20, 22.

Figure 2:
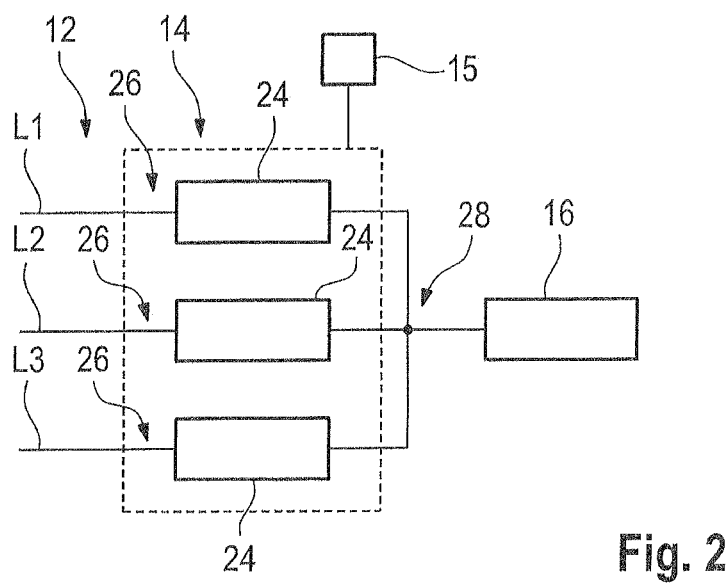
FIG. 2 shows a schematic illustration of a phase switching means used in the cooking appliance according to FIG. 1.

The variable phase switching means 14 is shown in greater detail in FIG. 2 according to a particular embodiment in which the phase switching means 14 is formed by three switching elements 24, each of which is allocated to a respective phase L1, L2, L3 of the power connection 12. The switching elements 24 each constitute an interface 26 of the phase switching means 14 here, via which the phase switching means 14 is connected to the power connection 12, in particular to the respective phases L1 to L3.

The switching elements 24 that come into consideration are solid state relays (SSRs) or semiconductor relays, contactors and/or intelligent relays. Generally, the variable phase switching means 14 may comprise solid state relays or SSRs, contactors, a switching system, intelligent relays or a plurality of (solid state) relays connected in series.

In the embodiment shown, the variable phase switching means 14 is formed merely by the switching elements 24, which are driven by the controller 15. As an alternative, the variable phase switching means 14 may include a controller itself, which communicates with the controller 15 of the cooking appliance 10.

The phase switching means 14 further includes an output interface 28, via which the at least one electrical load 16 is connected to the phase switching means 14.

Figures 3, 4:
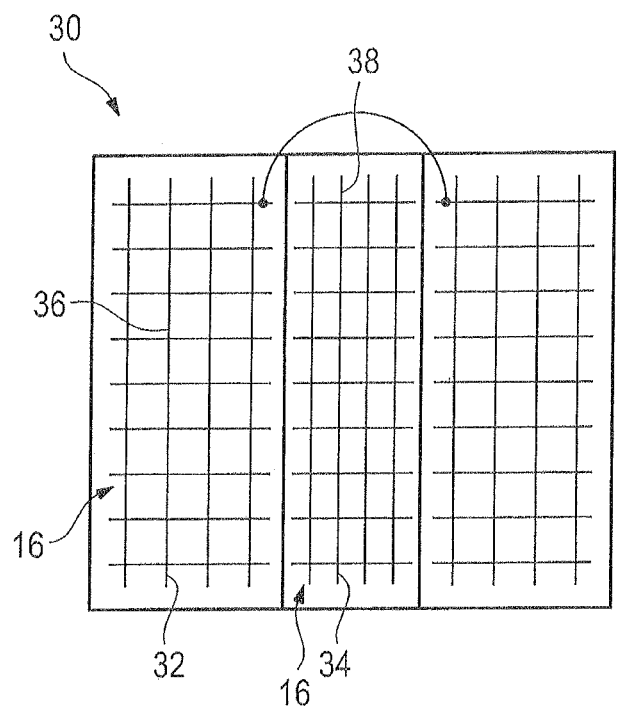
FIG. 3 shows a schematic illustration of an electrical load configured as a heating device and used in the cooking appliance according to FIG. 1.
FIG. 4 shows a flow chart illustrating the method according to the invention.

The electrical load 16 can be connected to a selected phase of the phases L1 to L3 of the power connection 12 in a variable manner by means of the phase switching means 14. This will be discussed in more detail below with reference to FIGS. 1, 2 and 4, with FIG. 4 showing a flow chart of the process flow.

The controller 15 of the cooking appliance 10 has access to a memory in which the cooking programs that can be executed by the cooking appliance 10 are stored. Based on this access, the controller 15 can determine the future power demand of the electrical loads 16 of the cooking appliance 10.

Stored in the memory are, among other things, the switching times of the electrical loads 16 as a function of the cooking progress and the corresponding current consumption of the electrical loads 16. Based on the cooking progress and the stored values, the controller 15 can determine whether and which electrical load 16 is connected and/or whether the power demand of an electrical load 16 that is currently ON will change.

The controller 15 is further connected to the phase switching means 14 and has access to the phases L1 to L3, connected thereto, of the power connection 12, so that the controller 15 can determine a current phase load of the respective phases L1 to L3 of the power connection 12. This means that the controller 15 realizes how high the current actual load on the phases L1 to L3 is. In doing so, the controller 15 determines the actual current value flowing over the respective phases L1 to L3.

The controller 15 can in particular determine here which of the phases L1 to L3 has the currently lowest phase load, in order to provide this phase for an electrical load 16 that will soon be connected or will soon have a higher power demand.

Depending on the future power demand of the electrical loads 16 as determined, the controller 15 then drives the variable phase switching means 14 such that, for example, a newly connected electrical load 16 is applied to that phase L1 to L3, previously determined, which currently has the lowest phase load. This ensures that the electrical load 16 is not applied to a phase L1 to L3 which already has a high or the highest load, which could cause this phase L1 to L3 to be too heavily loaded. In an extreme case, this could result in that the electrical loads 16 might only be operated with a restricted power potential.

The controller 15 drives the phase switching means 14 such that a newly connected electrical load 16 is variably connected to a phase L1 to L3 in such a way that as symmetrical a phase load as possible is obtained. Typically, here the controller 15 will select the currently least loaded phase.

Alternatively or additionally, the controller 15 detects that an electrical load 16 that is already ON will have a higher power demand in future, which would lead to a non-symmetrical phase load of the phases L1 to L3. As a result, the controller 15 drives the variable phase switching means 14 in such a way that the electrical load 16 which will have a higher power demand in future is applied to a phase L1 to L3 of the power connection 12 that currently has the lowest phase load. This ensures that in spite of the increase in the power demand of the electrical load 16, there is a phase load of the phases L1 to L3 that is distributed as evenly as possible.

Generally, when driving the phase switching means 14, the controller 15 takes into account in particular the future power demands of the further electrical loads 16 that are ON or of the electrical loads 16 that will be added in future.

Provision may further be made that the controller 15 cyclically checks the current phase load and the distribution of the electrical loads 16 to the individual phases L1 to L3 and, if required, makes adjustments in terms of allocating the electrical loads 16 to the individual phases L1 to L3. This ensures that a regular monitoring of the phase loads is effected and, if required, the electrical loads 16 are redistributed with regard to the allocation to the phases L1 to L3.

If an electrical load 16 has an extremely high power demand, the controller 15 can drive the phase switching means 14 such that the electrical load 16 is always connected to two phases L1 to L3 in order to reduce the load on one single phase L1 to L3. However, the two of the phases L1 to L3 to which the electrical load 16 is connected are not fixedly selected, but are periodically checked by the controller 15 with regard to their phase loads and, if required, the allocation of the electrical load 16 to the phases L1 to L3 is changed.

Depending on the degree of capacity utilization of the phases L1 to L3 and of the electrical loads 16 that are ON, it may be expedient that a plurality of electrical loads 16 are allocated to one and the same phase L1 to L3. This is particularly advantageous when two electrical loads 16 are ON which each have a low power demand and if two further electrical loads 16 having a high power demand are each allocated to a different phase L1 to L3.

Furthermore, the variable allocation of two electrical loads 16 to one of the plurality of phases L1 to L3 may be useful if the two electrical loads 16 are part of a common assembly, for example two heating circuits of a heating element. Such a heating element 30 is shown schematically in FIG. 3, for example.

The heating element 30 includes two separate heating zones 32, 34, which may also be referred to as heating circuits. The heating zones 32, 34 may be a main heating circuit 36 and an auxiliary heating circuit 38, the auxiliary heating circuit 34 being connected when a strong heating function of the heating element 30 is needed. The two heating zones 32, 34 constitute separate electrical loads 16, which are appropriately distributed to the phases L1 to L3 by the phase switching means 14.

The heating circuits 36, 38 can be connected independently of each other to different phases L1 to L3 of the power connection 12 by means of the variable phase switching means 14. Alternatively, it may be provided that the two heating circuits 36, 38 are always variably connected to an identical selected phase L1 to L3 of the power connection 12, since they are part of the common heating element 30. The two heating circuits 36, 38 are nevertheless variably allocated to a selected phase out of the phases L1 to L3, the allocation being monitored regularly in order to ensure a symmetrical phase load of all phases L1 to L3.

In a further alternative, the heating circuits 36, 38 may be fixedly connected to different phases, and the controller 15 only drives that heating circuit 36, 38 of the heating element 30 which is allocated to the phase that is less heavily loaded. This is particularly advantageous if the two heating circuits 36, 38 are designed to have the same strength. Accordingly, one heating element 30 constitutes the electrical load that can be variably connected. Furthermore, one heating element 30 may also include more than two heating circuits.

In the embodiment shown, the heating circuits 36, 38 are provided adjacent to each other, with the main heating circuit 36 at least partially surrounding the auxiliary heating circuit 38. As an alternative, the two heating circuits 36, 38, which have different electrical resistances, may also be arranged one above the other.

The heating areas 20, 22 shown in FIG. 1 may each be formed by two separate heating elements or by two heating circuits of a heating element, as is shown in FIG. 3.

Generally, the cooking appliance 10 and also the method allow the electrical loads 16 to be able to be variably connected to any of the electrical phases L1 to L3 of the power connection 12, with the phase L1 to L3 having the lowest load being automatically selected from among the existing phases of the power connection 12, in order to obtain a phase load on the individual phases L1 to L3 which is as uniform as possible. The phase allocation of the electrical loads 16 is therefore effected flexibly since the electrical load, in particular the heating element 30 having two heating circuits 36, 38, is always connected to the power connection 12 in such a way that a balanced phase load is achieved.

For example, three heating elements 30 may be provided, which each include two heating circuits 36, 38, the first heating element 30 being fixedly connected to the phases L1 and L2, the second heating element 30 being fixedly connected to the phases L1 and L2, and the third heating element 30 being fixedly connected to the phases L2 and L3.

When all three heating elements 30 are heated essentially in equal measure, the controller 15 can then drive the heating elements 30 such that the heating circuit fixedly connected to the phase L1 in the first heating element 30, the heating circuit fixedly connected to the phase L2 in the second heating element 30 and the heating circuit fixedly connected to the phase L3 in the third heating element 30 are driven. This results in the individual heating elements 30 being driven variably, allowing a balanced phase load to be achieved altogether.

In a further example, in which only the first heating element 30 and the third heating element 30 need to heat, with the third heating element 30 having a higher heating demand, the controller 15 may apply the first heating element to the phase L1 and the third heating element 30 to the second and third phases L2, L3. This also results in the load on the individual phases being balanced.

The invention claimed is:

1. A method of controlling a cooking appliance which includes at least one electrical load and a controller, the electrical load being variably connected to at least one of a plurality of phases of a power connection, the phase being selected from among the plurality of phases, based on a future power demand of the electrical load, wherein the future power demand of the electrical load, which defines whether the at least one electrical load is connected or switched off in the future, is acquired by the controller which accesses an ongoing cooking program in order to determine said future power demand, and depending on said future power demand, the electrical load is connected to a selected one of the plurality of phases of the power connection.

2. The method according to claim 1, wherein the current phase load of the respective phases of the power connection is acquired by the controller.

3. The method according to claim 2, wherein an electrical load which is being connected or has a higher future power demand is connected to the phase of the power connection which has the lowest current phase load.

4. The method according to claim 1, wherein the allocation of the electrical load to a phase of the power connection is checked by the controller in cycles and, if required, is changed.

5. The method according to claim 1, wherein the electrical load is variably connected to two phases of the power connection.

6. The method according to claim 1, wherein two electrical loads are provided, both of which are variably connected to the same phase of the power connection.

7. The method according to claim 1, wherein the electrical load is dedicated to two or more phases, the controller selecting at least one of the dedicated phases to variably connect the electrical load to at least one of the dedicated phases of the power connection.

8. A cooking appliance comprising at least one electrical load, a controller, and a variable phase switch which variably switches the electrical load with at least one of a plurality of phases of a power connection, the phase being selected from among the plurality of phases, based on a future power demand of the electrical load, wherein the controller is configured to access an ongoing cooking program in order to determine the future power demand of the electrical load, which defines whether the at least one electrical load is connected or switched off in the future and to connect the electrical load depending on said future power demand to a selected one of the plurality of phases of the power connection, via the variable phase switch.

9. The cooking appliance according to claim 8, wherein the phase switch is connected to all phases of the power connection via at least one interface.

10. The cooking appliance according to claim 8, wherein the electrical load is a heating device which has at least two heating areas, the heating areas being two heating zones of a heating element or being formed by two separate heating elements.

11. The cooking appliance according to claim 10, wherein at least one electrical load is dedicated to two or more phases, the controller connecting the electrical load to at least one of the dedicated phases via the variable phase switch.

12. The cooking appliance according to claim 8, wherein at least one electrical load is dedicated to two or more phases, the controller connecting the electrical load to at least one of the dedicated phases via the variable phase switch.

13. The cooking appliance according to claim 9, wherein the electrical load is a heating device Which has at least two heating areas, the heating areas being two heating zones of a heating element or being formed by two separate heating elements.

14. The cooking appliance according to claim 13, wherein at least one electrical load is dedicated to two or more phases, the controller connecting the electrical load to at least one of the dedicated phases via the variable phase switch.

15. The cooking appliance according to claim 9, wherein at least one electrical load is dedicated to two or more phases, the controller connecting the electrical load to at least one of the dedicated phases via the variable phase switch.

16. A method of controlling a cooking appliance which includes at least one electrical load and a controller, the electrical load being variably connected to at least one of a plurality of phases of a power connection by the controller, which controller is configured to access an ongoing cooking program in order to determine a future power demand, the phase having a lowest load being automatically selected from among the plurality of phases of the power connection by the controller, in order to produce a phase load on the individual phases which is as uniform as possible.

* * * * *